Jan. 1, 1924

J. F. McCANN

SILENT CHAIN DRIVING TRANSMISSION

Filed May 7, 1923

1,479,080

WITNESSES:
John W Harris
Carl E. Johnson

INVENTOR
John Francis McCann

Patented Jan. 1, 1924.

1,479,080

UNITED STATES PATENT OFFICE.

JOHN FRANCIS McCANN, OF SPRINGFIELD, MASSACHUSETTS, ASSIGNOR TO DUCK-WORTH CHAIN & MANUFACTURING COMPANY, OF SPRINGFIELD, MASSACHUSETTS.

SILENT CHAIN DRIVING TRANSMISSION.

Application filed May 7, 1923. Serial No. 637,388.

*To all whom it may concern:*

Be it known that I, JOHN FRANCIS MC-CANN, a citizen of the United States, and a resident of Springfield, in the county of Hampden and State of Massachusetts, acting for the Duckworth Chain & Manufacturing Company, also of county of Hampden and State of Massachusetts, have invented certain new and useful Improvements in Silent Chain Driving Transmission, of which the following is a specification.

This invention relates to round hollow split pins, used between chain links that are to be hinged together, and has special reference to a pin of this construction, which due to a narrow split lengthwise of the pin, gradually closes when under tension, thus relieving the inside bearing surface of the inclosing links, of excessive frictional wear. This split construction also allows lubricating oil to seep through the narrow split in pin, to outside bearing surface of said pin, thus insuring a maximum amount of lubrication where needed.

The hollow construction of the pin also allows air and lubricating oil to circulate on inside of said pin, drawing frictional heat from the outside bearing surface, thus maintaining a cool, heat resisting bearing surface.

One object of the invention is the reduction to a minimum of the friction in a chain joint, and consequently the production of a chain in which the lengthening or stretching, due to wear in the joints, shall be negligible.

The only means by which silent chain driving can be made practicable, lies in the construction of a chain whose pitch shall not change perceptibly by long use, since in chains where stretch is not eliminated the pitch between the chain and sprocket wheels soon varies to such a degree as to destroy both the sprocket wheels and the chain. Stretching is eliminated in the present construction due to the slight closing of the hollow split pin when under tension, thus relieving the inside bearing surface of the chain links from excessive frictional wear.

Having in view the purpose and end above outlined the invention consists in the construction, arrangement, and combination of parts hereinafter fully described and set forth in the claim.

Figure 1:
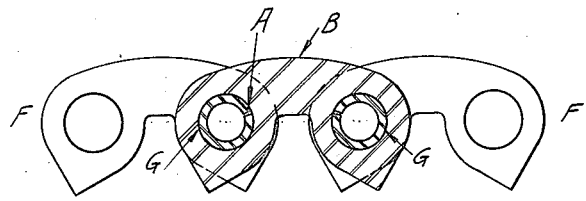
Figure 2:
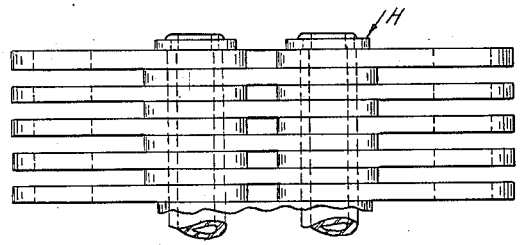
Figure 3:
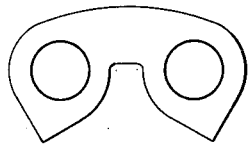
Figure 4:
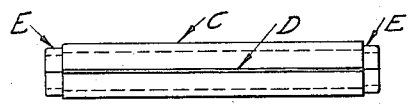
Figure 5:

In the accompanying drawing which forms a part of this specification Fig. 1 represents a side elevation of a silent type driving chain, with hollow split pins therein, forming a joint. Fig. 2 represents in plan, a portion of a drive chain wherein each link is, in effect composed of several plates placed side by side, the plates of each link alternating with and overlapping the ends of those in the adjacent link. The hollow pins are shown in this view peened over after spacing washers H are placed over ends between the links and ends of pins. Fig. 3 represents a side elevation of an individual link of this sort separated. Figs. 4 and 5 represent side and end elevation, respectively, the round hollow split pin being shown separated from the driving links of the chain.

Referring to Figs. 1 to 3, A represents the hollow split pin assembled with driving links B which constitute a silent chain driving unit.

Referring to Figs. 4 and 5, C represents the hollow split pin, D showing the narrow opening running lengthwise, shoulder to shoulder of pin. E represents rolled shoulder, which unlike the rest of pin is closed tightly and rolled down to a diameter less than the body diameter of pin between the shoulders.

Referring to Fig. 1 the exact coaction of the round hollow split pin A and chain links B is as follows, when the tension of the driving load is exerted at $F-F^1$ the round hollow pin A due to the narrow split between shoulders, and the spring temper heat treatment which said pins are subjected to, gradually closes together for an instant relieving the abnormal tension on links B, until the chain has passed to negative side of drive, thereby eliminating the intense frictional wear on the inside of hole in the links at G which would obviously take place if pin A was of absolute solid construction instead of the hollow and split construction heretofore described.

Having described the nature and objects of the invention, I now desire to secure as patented the following claim:

In a silent chain, a round hollow pin with a narrow split opening, extending between shoulders, said shoulders unlike rest of pin being rolled tightly together and smaller in diameter than body size of pin.

JOHN FRANCIS McCANN.

Witnesses:
    JOHN W. HARRIS,
    CARL E. JOHNSON.